US007827324B2

(12) United States Patent
Carr et al.

(10) Patent No.: US 7,827,324 B2
(45) Date of Patent: Nov. 2, 2010

(54) METHOD OF HANDLING FLOW CONTROL IN DAISY-CHAIN PROTOCOLS

(75) Inventors: David Carr, Ontario (CA); Robert James, San Jose, CA (US)

(73) Assignee: Integrated Device Technology Inc., San Jose, CA (US)

( * ) Notice: Subject to any disclaimer, the term of this patent is extended or adjusted under 35 U.S.C. 154(b) by 0 days.

(21) Appl. No.: 11/524,660

(22) Filed: Sep. 20, 2006

(65) Prior Publication Data

US 2008/0126607 A1 May 29, 2008

(51) Int. Cl.
*G06F 3/00* (2006.01)

(52) U.S. Cl. .......... 710/29

(58) Field of Classification Search .......... 710/29
See application file for complete search history.

(56) References Cited

U.S. PATENT DOCUMENTS 7,346,749 B2 * 3/2008 Goethals .......... 711/156
7,606,147 B2 * 10/2009 Luft et al. .......... 370/229
2004/0174890 A1 * 9/2004 Chen et al. .......... 370/402
2006/0187874 A1 * 8/2006 Zaki .......... 370/328
2006/0221831 A1 * 10/2006 Wadekar et al. .......... 370/235

* cited by examiner

*Primary Examiner*—Christopher B Shin
*Assistant Examiner*—Zachary K Huson
(74) *Attorney, Agent, or Firm*—Hayes and Boone

(57) ABSTRACT

A system that includes a host and a peripheral device. The host transmits a packet that includes a command and a flow control field. The peripheral device receives the packet and has the ability to execute the command, wherein the peripheral device can determine whether the command can be processed in a timely manner, and can update the packet's flow control field with flow control data based on the determination. The host receives the updated packet and has the ability to adjust the flow control of subsequent packets to the peripheral device based on the flow control data in the updated packet.

8 Claims, 4 Drawing Sheets

METHOD OF HANDLING FLOW CONTROL IN DAISY-CHAIN PROTOCOLS

FIELD OF THE INVENTION

The present invention relates to integrated circuits, and in particular, to communication between integrated circuits.

DISCUSSION OF RELATED ART

Modem networking systems allow users to obtain information from multiple data sources. These data sources may include, for example, publicly accessible web pages on the Internet as well as privately maintained and controlled databases. Users may access data from the data sources by entering certain identifying information. For example, a user on the Internet may access data on a website by entering the domain name of the website, where the domain name serves as the identifying information. Similarly, a user of a corporate database may access personnel data about a company employee by entering the last name of the employee, where the last name serves as identifying information. In some instances, a network search engine ("NSE") may facilitate the process of looking-up the location of the requested data.

For example, a router may receive communications from a network and provide this information to a first integrated circuit ("IC"), such as an application-specific IC ("ASIC"). The ASIC then provides the identifying information to the NSE, which may be implemented by a second IC, to determine the location in the memory of the requested data. After determining the location of the data, the NSE may request that the memory provides the requested data to the ASIC while also informing the ASIC that the requested data is being sent by the memory. In many networking systems, the NSE is mounted to the same printed circuit board ("PCB") as the ASIC with the traces of the PCB connecting the two components. Although some networking systems may substitute a network processing unit ("NPU") or a field programmable gate array ("FPGA") for the ASIC in this description, the roles of the respective components remain the same. Thus, in some networking systems, the NPU or FPGA may accept communications from the network and provide the identifying information to the NSE, which may facilitate delivering the requested data to the NPU or FPGA.

In some networking systems, communication between the NSE and the ASIC occur using parallel bus architecture on a printed circuit board. Initially, bi-directional parallel buses were used, which created an IC using the same pins to both send and receive information. As data rates between the NSE and ASIC increased, networking systems were implemented using uni-directional parallel buses in which the ICs used each pin to either send or receive data, but not both. To accommodate the amount of data being transmitted between the ASIC and the NSE, some current networking systems use an 80-bit bus on the printed circuit board to connect the ASIC and NSE. Issues have arisen, though, with using the parallel bus architecture to connect the ASIC and the NSE. For example, using an 80-bit bus complicates the design and layout process of the printed circuit board. Additionally, increasing processing and communication speeds have exposed other limitations with the parallel bus architecture. For example, the data transmitted by a parallel bus should be synchronized, but as communication speeds have increased, the ability to synchronize data transmitted on a parallel bus has become problematic. Further, it is difficult to route wide busses because traces should be kept short and equal length to avoid skewing. Because of the short distance, the NSE must be located close to the ASIC, resulting in many hot chips being located close together. This close placement creates thermal issues on the printed circuit board.

In response to the issues posed by using a parallel bus, some networking devices connect the ASCI and NSE with a high speed serial bus. Further, the networking device may use a serializer-deserializer ("SERDES") to allow the ASIC and NSE to continue using a parallel interface to communicate with each other. For example, when the ASIC communicates with the NSE, a SERDES may convert the parallel output from the ASIC, converting it to a serial data stream to be transmitted to the NSE. Another SERDES may receive this serial transmission and convert it to a parallel data stream to be processed by the NSE. As a result, instead of transmitting data over an 80-bit parallel bus at 250 MHz Double Data Rate (40 Gbps), networking devices could transmit data over 8 serial lanes operating at 6.25 Gbps. Despite this increase in data transmission rates as compared to systems using parallel bus architecture, increasing clock speeds and data transmission rates may require developers of networking devices to seek additional methods for increasing the transmission rates between the ASIC and the NSE.

In typical daisy chain network, which includes a host (such as an ASIC, FPGA, or NPU) coupled to a series of peripheral devices (such as an NSE, memory, etc.) hereby forming a daisy-chain configuration, these components communicate with each other using a single unidirectional path. A communication from the host to a specific peripheral device travels through each device in the series of peripheral devices until the communication reaches the specific device. When the specific device provides a response to the communication, the response shall be transmitted through any remaining peripheral devices before being transmitted back to the host.

Some commands, transmitted from the host to the peripheral devices, may take longer to execute than other commands. If a peripheral device receives one of these longer executing commands, the peripheral device may delay processing the subsequent commands that are located in its command queue awaiting execution. But the host still provides subsequent commands to the delayed peripheral device and the peripheral device does not have the ability to notify the host to slow down.

Alternatively, to remedy the above problem, some schemes have the peripheral device ignoring the packets intended for them without indicating why they are ignoring the packets. As a result, the host has to resubmit the packets to the peripheral device thereby adding overhead to the host. Further, this alternative scheme wastes the bandwidth of the daisy-chain configuration because there is unnecessary repetition between the host and the peripheral devices.

Alternatively, to remedy the above problem, some schemes have the peripheral device inserting a specific flow control packet into the data path. As a result this alternative scheme wastes the bandwidth of the daisy-chain configuration because it adds traffic between the peripheral devices and the host.

Alternatively, to remedy the above problem, some schemes provide that the peripheral device adds flow control data onto the packet thereby increasing the packet length. As a result, this alternative scheme wastes the bandwidth of the daisy-chain configuration because it adds traffic between the peripheral devices and the host.

SUMMARY

In accordance with some embodiments of the present invention, a system is presented. The system includes a host and a peripheral device. The host is configured to transmit a packet, wherein the packet includes a command and a flow control field. The peripheral device receives the packet and has the ability to execute the command, wherein the peripheral device can determine whether a command queue of the peripheral device is too congested to execute the command of the packet, and update the packet with flow control data based on the determination. The host then receives the updated packet and has the ability to adjust the flow of subsequent packets to the peripheral device based on the flow control data in the updated packet.

In accordance with some embodiments of the present invention, a method is presented. The method includes receiving a packet transmitted by a host of a daisy-chain network, wherein the packet includes a command and a flow control field; determining whether the command can be processed in a timely manner; updating the packet's flow control field with flow control data based on the determination, wherein the flow control data is used to adjust a rate of subsequent packets provided to the daisy-chain network; and transmitting the updated packet to the host.

In accordance with some embodiments of the present invention, a method is presented. The method includes receiving a packet from a peripheral device; determining whether the packet includes flow control data in the flow control field; and modifying the flow of subsequent data packets transmitted to the peripheral device based on the determination.

In accordance with some embodiments of the present invention, a peripheral device is presented. The peripheral device includes means for receiving a packet transmitted by a host of a daisy-chain network, wherein the packet includes a command and a flow control field; means for determining whether the command can be processed in a timely manner; means for updating the packet's flow control field with flow control data based on the determination, wherein the flow control data is used to adjust a rate of subsequent packets provided to the daisy-chain network; and means for transmitting the updated packet to the host.

In accordance with some embodiments of the present invention, a host is presented. The host includes means for receiving a packet from a peripheral device; means for determining whether the packet includes flow control data in the flow control field; and means for modifying the flow of subsequent data packets transmitted to the peripheral device based on the determination.

A more complete understanding of embodiments of the present invention will be appreciated by those skilled in the art, as well as a realization of additional advantages thereof, by a consideration of the following detailed description of one or more embodiments. Reference will be made to the appended drawing that will first be described briefly.

DETAILED DESCRIPTION

Reference will now be made in detail to the exemplary embodiments implemented according to the invention, the examples of which are illustrated in the accompanying drawings. Wherever possible, the same reference numbers will be used throughout the drawings to refer to the same or like parts.

Figure 1:
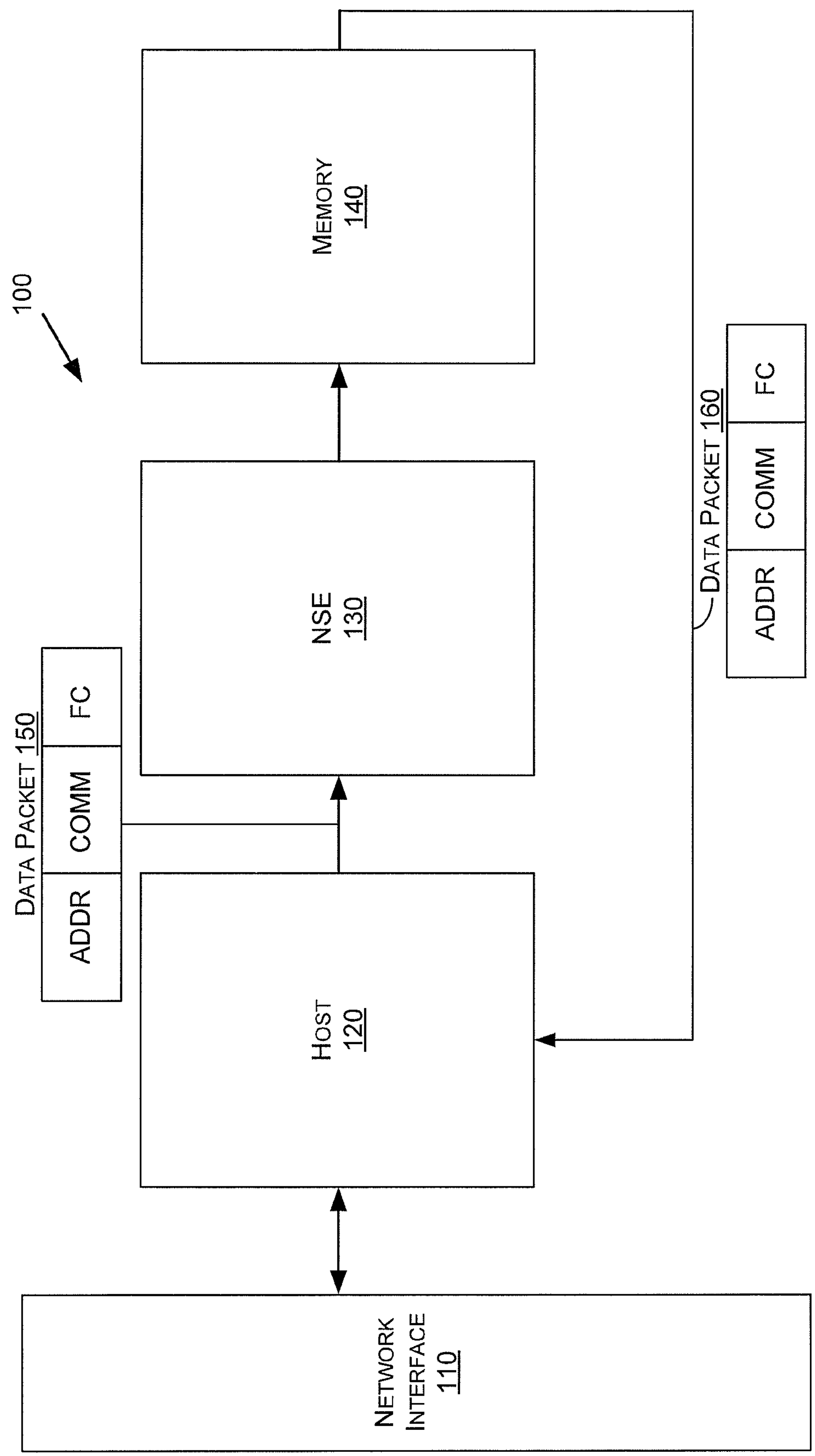
FIG. 1 shows a block diagram of the exemplary system.

FIG. 1 shows a block diagram of an exemplary system. Exemplary system 100 can be any type of system that includes a memory-type of device performing complex operations, such as data searching. For example, exemplary system 100 can be utilized in a printed circuit board on a router, an enterprise switch, a storage area network (SAN), a Cable Modem Termination System (CMTS), and a Digital Subscriber Line Access Multiplexer (DSLAM). Further, the exemplary system 100 can be utilized when the printed circuit board provides a connector, a serial interface, and a peripheral device (e.g., NSE) that are located on a daughtercard. The exemplary system 100 can include, among other things, a network interface 110, a host 120, a network search engine (NSE) 130, and a memory 140.

Network interface 110 is a software program and/or a hardware device that communicatively couples exemplary system 100 to the communication means (e.g. wireless and/or wired) connecting exemplary system 100 and the network. Network interface 110 is configured to receive data from the network, translate the data, and provide the data to the host 120 and vice versa.

Host 120 is an integrated circuit configured to provide data packets to NSE 130 and receive data packets corresponding to the packets provided to NSE 130. Based on data received from network interface 110, host 120 generates a data packet (e.g., such as data packet 150). This data packet can include, among other things, a flow control (FC), a command field (COMM) including a command to be processed, and an address field (ADDR) identifying one or more peripheral devices (e.g., NSE 130) to perform the command. For example, the data packets can be a 192 bit data packet but it is not limited to a specific bit size. Host 120 can include one or more ports using one or more sets of serial lanes that can provide data to NSE 130 up to, for example, 10 Gbits/s. Host 120 can also receive data packets (e.g., such as data packet 160) from a peripheral device, such as memory 140 and/or NSE 130, wherein the received data packet can be the same size as the data packet sent from host 120 to NSE 130 (otherwise known as a fixed-length data packet). These received data packets may include flow control data, within the flow control field, notifying host 120 that a peripheral device could not execute the attached command. In some embodiments, host 120 can be an ASIC, an NPU, a CPU, or an FPGA.

NSE 130 is a device that can receive packets from host 120 and perform a data lookup, based on the command in the packet, within the data memory array for the identifying data. Once NSE 130 completes the lookup for the requested data, NSE 130 can transmit an index to host 120 or another peripheral device, such as memory 140. NSE 130 further includes a command queue. If the command queue becomes overloaded, NSE 130 can update the data packet's flow control field and transmit the data packet to host 120 through the daisy chain network. NSE 130 can be located on the same printed circuit board as host 120. For example, NSE 130 can be an Integrated Device Technology NSE. In some embodiments, NSE 130 can include multiple NSEs coupled together though parallel or serial busses.

Memory 140 is a peripheral device that stores data until requested to do so by NSE 130. When memory 140 receives the index from NSE 130, memory 140 can supply the associated data to host 120. The associated data can include the next hop information quality of service, permit/deny decisions, or a multitude of other information that the host ASIC requires to forward (or block) the packet. For example, memory 140 can be an Integrated Device Technology Zero Bus Turnaround SRAM. In some embodiments, memory 140 can be deleted from exemplary system 100 and the result of the lookup at NSE 130 is provided to host 120, wherein the associated data memory is attached to the host ASIC directly. Further, in some embodiments, memory 140 can be replaced with an additional NSE. Furthermore, in some embodiments, memory 140 and NSE 130 can operate as a single unit.

Figure 2:
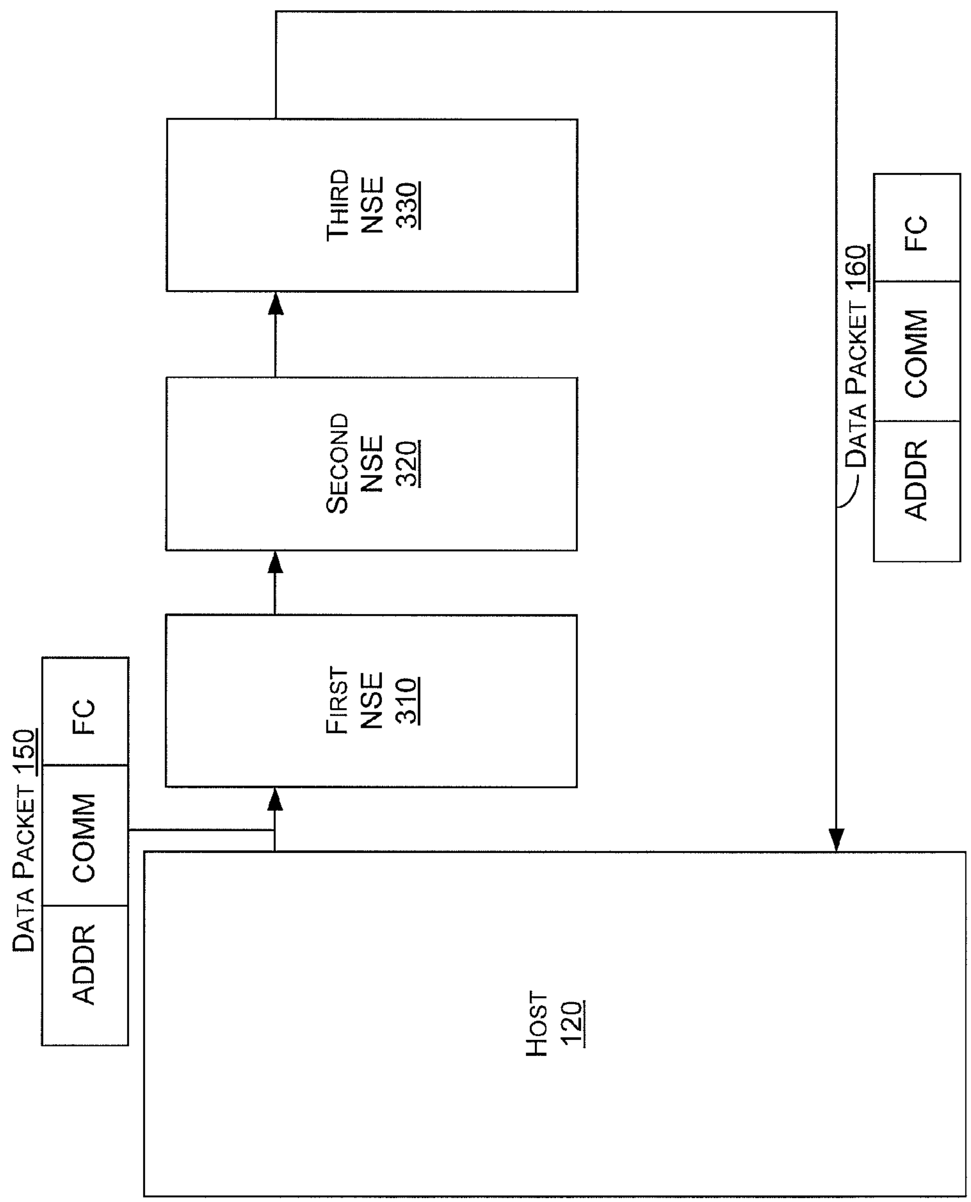
FIG. 2 shows an exemplary embodiment of a daisy-chain network.

FIG. 2 shows an exemplary embodiment illustrating a host communicating with NSEs 310, 320, 330 of a daisy-chain network. While NSEs 310, 320, 330 in FIG. 2 are provided in a serial configuration, the NSEs can also be set up in a parallel configuration using one or more serial shims (not shown). Please note that while three NSEs (NSEs 310, 320, and 33) are shown, any number of NSEs can be used in the daisy-chain configuration. Further, please note that while we are using NSEs 310, 320, 330 as the peripheral devices, the peripheral devices can be a content addressable memory (CAM) or a memory device (such as an SRAM).

In this exemplary embodiment, host 120 provides a series of packets (e.g., such as data packet 150) to the peripheral devices (e.g., NSEs 310, 320, 330). Each of these packets may include, among other things, a flow control field (FC), a command field (COMM) that includes a command to be processed, and an address field (ADDR) designating one or more NSEs to process the command. If a particular NSE gets congested with too many commands at the command queue, the NSE can update the data packet's flow control field by setting one or more bits within the packet indicating that the NSE is congested. Further, the one or more bits can indicate how long the host should wait before resending the packet. The NSE can forward the updated data packet (e.g., such as data packet 160) to the host through any remaining peripheral devices. As a result, host 120 can either slow down or stop issuing commands to the particular congested NSE and/or the other non-congested NSEs.

For example, host 120 transmits a first packet to first NSE 310, wherein the first packet includes data indicating that a command is to be sent to first NSE 310. First NSE 310, which is not congested, begins processing the command within the data packet; wherein the command of the first packet takes longer to process. Subsequent to transmitting the first packet, host 120 transmits a second packet to first NSE 310. Because the first packet takes longer to process, first NSE 310 updates the second packet by providing flow control data to the flow control field of the second packet. For example, the update of the second packet can include setting one or more bits within the flow control field to indicate that the first NSE 310 is congested. First NSE 310 then transmits the updated packet through second NSE 320 and third NSE 330 to host 120, which reads the flow control data from the updated packet, and has the ability to stop or slow down the messages to the first NSE. In some embodiments, a command may require that two peripheral devices assist in execution wherein one of the peripheral devices is too busy. If so, the busy peripheral device can set the flow control bit and delay the execution of the command until both peripheral devices are free. This would free the non-busy peripheral device from processing the command until both peripheral devices are free to do so.

Figure 3:
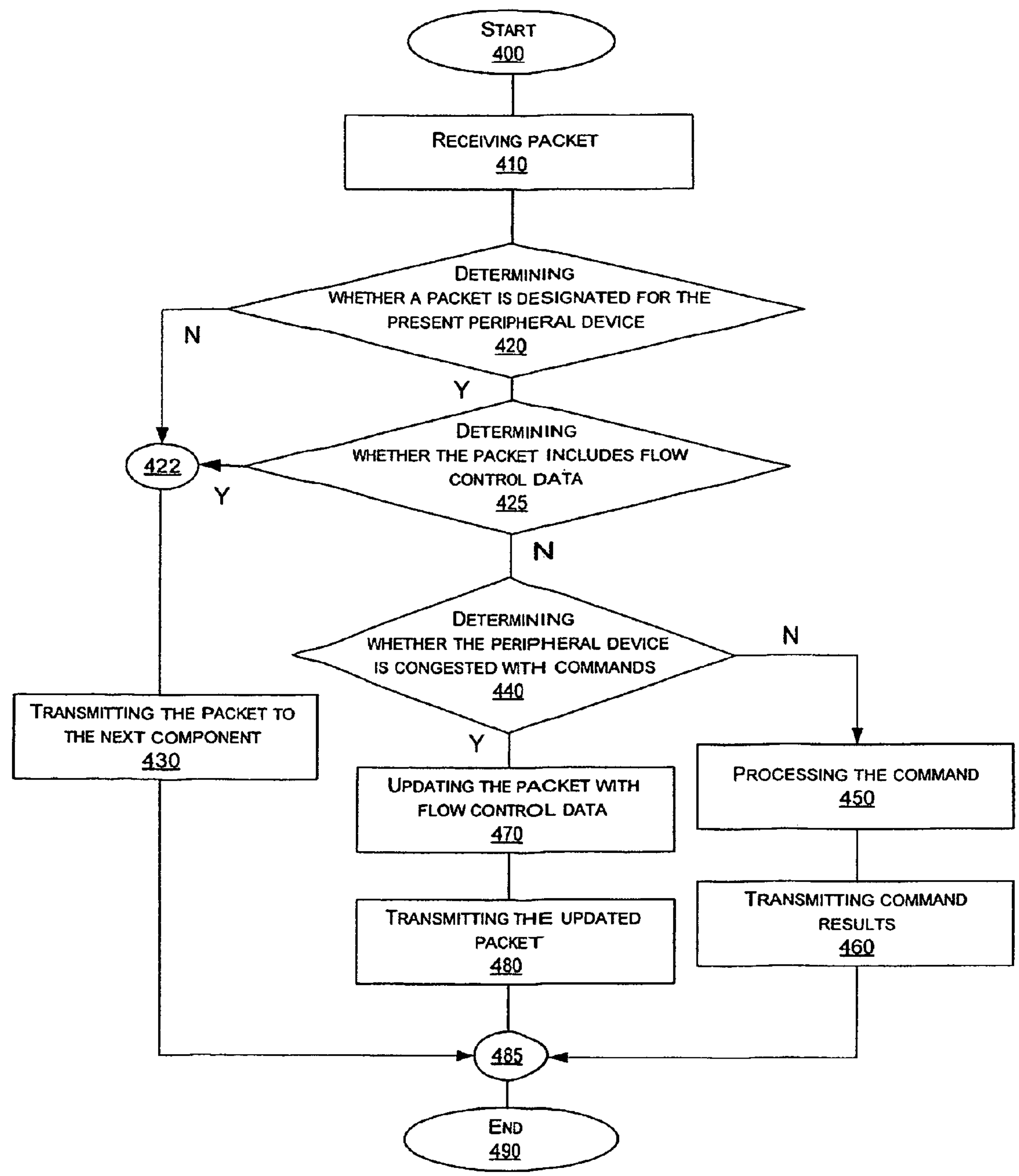
FIG. 3 shows a flowchart providing an exemplary method for updating a packet with flow control data at a peripheral device.

FIG. 3 shows a flowchart providing an exemplary method for updating a packet with flow control data at a peripheral device. Referring to FIG. 3, it will be readily appreciated by one of ordinary skill in the art that the illustrated procedure can be altered to delete steps, move steps within the flowchart, or further include additional steps. After initial start step 400, a peripheral device receives a packet from a host in step 410. The packet can include, among other things, a flow control field, a command field that includes a command to be processed, and an address field designating one or more peripheral devices to process the command.

Once the peripheral device receives the packet, the peripheral device determines whether the packet is designated for it in step 420. If the packet is not designated for this peripheral device, the peripheral device passes the packet to the next component in step 430, wherein the component can be the next peripheral device or the host. After passing the packet to the next component, the method can proceed to connector 485.

On the other hand, if the packet is designated for this peripheral device, the peripheral device determines whether the flow control field includes flow control data in step 425. In some embodiments, the host may assign multiple peripheral devices (such as NSE 310, NSE 320, and NSE 330) to execute a command. If one of the peripheral devices (NSE 310) is too congested to execute a command while the other peripheral devices (NSE 320 and NSE 330) are not, the other peripheral devices would only process the command thereby providing the host with an incomplete processed command. To free the other peripheral devices from executing the command, the other peripheral devices would check the data packet for any flow control data. If the data packet includes flow control data, the peripheral devices passes the packet, without processing the command, to the next component in step 430, wherein the component can be the next peripheral device or the host. After passing the packet to the next component, the method can proceed to connector 485.

Otherwise, if the data packet does not include flow control data, the peripheral device determines whether the command queue of the peripheral device is too congested to accept another command from the host in step 440. If the command queue is not congested, the peripheral device processes the command in step 450 and transmits the command results to the serial device in step 460, which routes the command results to the host. Instead of determining whether the command queue is too congested, in some embodiments, the peripheral device can determine whether the command can be processed in a timely manner, such as, for example, immediately upon receipt of the data packet or prior to the end of an established time period. After the transmission, the method can proceed to connector 485.

If the peripheral device cannot process the command, the peripheral device can update the received packet with flow control data without increasing the data packet size in step 470. For example, the peripheral device can update the packet with flow control data by setting one or more packet bits indicating that the peripheral device cannot process the command at this time, by providing its particular identification to notify the host to slow the commands to that peripheral device, and/or by providing data that indicates how long the host should wait before resending the packet back to the same peripheral device. Once the updating has occured, the peripheral device can transmit the packet through any remaining peripheral devices to the serial interface in step 480. The method can proceed to connector 485 and then end at step 490.

Figure 4:
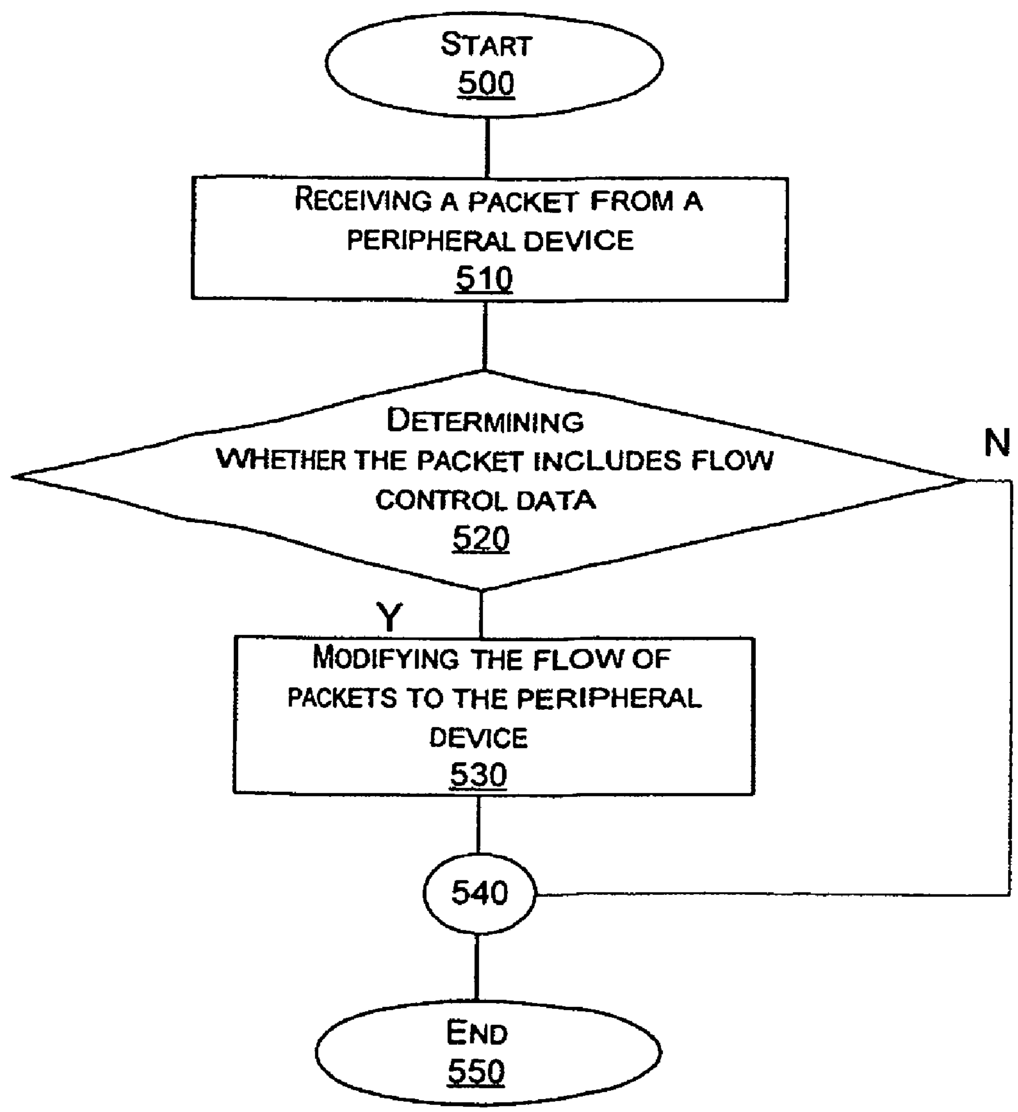
FIG. 4 shows a flowchart providing an exemplary method for processing a data packet at a host.

FIG. 4 shows a flowchart providing an exemplary method for processing a data packet at a host. Referring to FIG. 4, it will be readily appreciated by one of ordinary skill in the art that the illustrated procedure can be altered to delete steps, move steps within the flowchart, or further include additional steps. After initial start step 500, a host receives a packet (or a frame) from a peripheral device in step 510, such as a network search engine or a memory device.

Once the host receives the packet, the host can determine whether the packet has been updated to include flow control data in step 520. A peripheral device has the capability to update the packet based on whether its command queue is congested. A peripheral device can update the packet to include flow control data by setting one or more bits within the packet indicating that the peripheral device is congested, by providing its particular identification to notify the host to slow the commands to that peripheral device, and/or by providing data that indicates how long the host should wait before resending the packet back to the same peripheral device. If the serial interface determines that the flow control data has not been added to the received packet, the method can proceed to connector 540.

On the other hand, if the host determines that the flow control data has been added to the received packet, the host can modify the data packet flow to the congested peripheral device in step 530. The host has the ability to stop or slow down the messages to a congested peripheral device and any other peripheral devices within the daisy-chain network. In some embodiments, the host has a weighting mechanism that re-routes the data packets from the congested peripheral device to the other non-congested peripheral devices. In some embodiments, the host can After the serial device has provided the flow control data to the host, the method can then end in step 550.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:

a host integrated circuit, located on a printed circuit board, configured to transmit a packet, wherein the packet includes a command and a flow control field; and a peripheral integrated circuit, the peripheral integrated circuit coupled to the host integrated circuit through traces on the printed circuit board, that receives the packet and has the ability to execute the command, wherein the peripheral integrated circuit can determine whether it is too congested to execute the command of the packet, update the packet with flow control data based on the determination, and transmit the updated packet to the host integrated circuit;

wherein the host integrated circuit receives the updated packet and has the ability to adjust the flow of subsequent packets to the peripheral integrated circuit based on the flow control data in the updated packet; and further wherein the host integrated circuit and the peripheral integrated circuit communicate with each other using a single unidirectional path.

2. A method comprising:

receiving a packet transmitted by a host integrated circuit of a daisy-chain network, the daisy-chain network being coupled by traces on a circuit board, wherein the packet includes a command and a flow control field;

determining whether the command can be processed in a timely manner;

updating the packet's flow control field with flow control data based on the determination, wherein the flow control data is used to adjust a rate of subsequent packets provided to the daisy-chain network; and transmitting the updated packet to the host integrated circuit further wherein the daisy-chain network comprises a single unidirectional path.

3. The method of claim 2, further comprising determining whether the flow control field has been updated with flow control data.

4. The method of claim 2 wherein updating the packet's flow control field with flow control data when a command queue is too congested to process the command in a timely manner.

5. A method comprising:

receiving in a host integrated circuit a packet from a peripheral integrated circuit coupled to the host integrated circuit by traces on a circuit board;

determining whether the packet includes flow control data in the flow control field; and modifying the flow of subsequent data packets transmitted to the peripheral integrated circuit based on the determination; and further wherein the host integrated circuit and the peripheral integrated circuit communicate with each other using a single unidirectional path.

6. A peripheral integrated circuit comprising:

means for receiving a packet transmitted by a host integrated circuit of a daisy-chain network coupled by traces on a circuit board, wherein the packet includes a command and a flow control field;

means for determining whether the command can be processed in a timely manner;

means for updating the packet's flow control field with flow control data based on the determination, wherein the flow control data is used to adjust a rate of subsequent packets provided to the daisy-chain network; and means for transmitting the updated packet to the host integrated circuit further wherein the daisy-chain network comprises a single unidirectional path.

7. A host integrated circuit comprising:

means for receiving in a host integrated circuit a packet from a peripheral integrated circuit coupled to the host integrated circuit by traces on a circuit board;

means for determining whether the packet includes flow control data in the flow control field; and means for modifying the flow of subsequent data packets transmitted to the peripheral integrated circuit based on the determination; and further wherein the host integrated circuit and the peripheral integrated circuit communicate with each other using a single unidirectional path.

8. A system comprising:

a host integrated circuit, located on a printed circuit board, configured to transmit a packet, wherein the packet includes a command and a flow control field; and a plurality of peripheral integrated circuits, the peripheral integrated circuits coupled to the host integrated circuit through traces on the printed circuit board, that receive the packet and have the ability to execute the command, wherein the command requires that two or more peripheral integrated circuits assist in its execution; further wherein the peripheral integrated circuits can determine whether one of them is too congested to execute the command of the packet, update the packet with flow control data based on the determination, and transmit the updated packet to the host integrated circuit;

wherein the host integrated circuit receives the updated packet and has the ability to adjust the flow of subsequent packets to the plurality of peripheral integrated circuits based on the flow control data in the updated packet; and further wherein the host integrated circuit and the plurality of peripheral integrated circuits communicate with each other using a single unidirectional path.

* * * * *